(12) United States Patent
Gorfinkel et al.

(10) Patent No.: US 10,664,238 B2
(45) Date of Patent: May 26, 2020

(54) QUANTUM TRUE RANDOM NUMBER GENERATOR

(71) Applicant: THE RESEARCH FOUNDATION FOR THE STATE UNIVERSITY OF NEW YORK, Albany, NY (US)

(72) Inventors: Vera Gorfinkel, Setauket, NY (US); Boris Gorbovitski, Stony Brook, NY (US); Dmytro Gudkov, Setauket, NY (US)

(73) Assignee: THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 9 days.

(21) Appl. No.: 15/881,275

(22) Filed: Jan. 26, 2018

(65) Prior Publication Data
US 2018/0217817 A1    Aug. 2, 2018

Related U.S. Application Data

(60) Provisional application No. 62/451,239, filed on Jan. 27, 2017.

(51) Int. Cl.
*G06F 7/58* (2006.01)
*G01J 1/42* (2006.01)
*H04L 9/08* (2006.01)

(52) U.S. Cl.
CPC ............. *G06F 7/588* (2013.01); *G01J 1/42* (2013.01); *H04L 9/0852* (2013.01)

(58) Field of Classification Search
None
See application file for complete search history.

(56) References Cited

U.S. PATENT DOCUMENTS

| | | | |
|---|---|---|---|
| 2006/0115086 A1* | 6/2006 | Beausoleil | G06F 7/588 380/263 |
| 2008/0040410 A1* | 2/2008 | Vartsky | B82Y 10/00 708/255 |

(Continued)

OTHER PUBLICATIONS

Gudkov et al. "Multi-color single photon detection with enhanced linearity", IEEE Sensors Journal, (vol. 16, No. 4, Feb. 15, 2016.
(Continued)

*Primary Examiner* — Michael D. Yaary
(74) *Attorney, Agent, or Firm* — Gary J. Gershik; Cooper & Dunham LLP

(57) ABSTRACT

A true random number generator including a light source configured to produce randomly distributed photons, a plurality of detection channels configured to receive the randomly distributed photons produced by the light source, each detection channel including a photon sensor configured to detect a receipt of at least one photon during successive integration time-periods and generate an output signal by assigning a value for each integration time-period based on whether at least one photon was received during each integration time-period, a signal conditioning unit configured to condition the output signal of each of the plurality of detection channels and generate a conditioned output signal for each of the plurality of detection channels, and a signal processing unit configured to combine the conditioned output signals and generate a true random number based on the combination of the conditioned output signals.

20 Claims, 6 Drawing Sheets

(56) References Cited

U.S. PATENT DOCUMENTS

2012/0221615 A1* 8/2012 Cerf .................. G06F 7/588
708/250
2015/0193207 A1* 7/2015 Pooser ................ G06F 7/588
708/255

OTHER PUBLICATIONS

Gudkov et al. "Enhancing the Linear Dynamic Range in Multi-Channel Single Photon Detector beyond 7OD", IEEE Sensors Journal. 15(12):7081-7086, 2015.
Tsupryk et al., "Ultra-sensitive sensor with enhanced dynamic range for high speed detection of multicolor fluorescence radiation", Biosensors and Bioelectronics 23, 1512-1518, (2008).
Gudkov et al. "Detection of multi-color fluorescent objects with single photon spectrometer", Biosensors and Bioelectrcnics, vol. 39, Issue 1, pp. 152-155, 2013.
Dhulla et al., "Silicon photomultiplier: Detector for highly sensitive detection of fluorescence signals," Conference on Quantum Electronics and Laser Science. CLEO/QELS 2008.
Dhulla et al., "Single Photon Counting Module Based on Large Area APD and Novel Logic Circuit for Quench and Reset Pulse Generation", IEEE Journal of Selected Topics in Quantum Electronics, vol. 13, No, 4, 926-933 (2007).
Beznosko et al., "Random Number Hardware Generator Using Geiger-Mode Avalanche Photo Detector", Jan. 2015.
Cherkaoui et al., "A Very High Speed True Random Number Generator with Entropy Assessment", 2013.
Stipčević et al., "True Random Number Generators", Nov. 2014, pp. 275-315.
Michael Wahl et al., "An ultrafast quantum random number generator with provably bounded output bias based on photon arrival time measurements", Applied Physics Letters 98, 171105 (2011).
Intel DRNG guide (https://software.intel.com/en-us/articles/intel-digital-random-number-eneratordrng- software-implementation-guide.

* cited by examiner

QUANTUM TRUE RANDOM NUMBER GENERATOR

CROSS REFERENCE TO PRIOR APPLICATION

This application claims priority to U.S. Provisional Application Ser. No. 62/451,239, filed on Jan. 27, 2017, which is hereby incorporated by reference in its entirety.

FIELD

Embodiments of the present invention are generally directed to a quantum true random number generator.

BACKGROUND

Random numbers are typically necessary in cryptography, statistical research, including quantum cryptography, statistical research (Monte Carlo simulations in physics, biology, economics, etc.), randomized algorithms, etc. True random numbers (e.g., random numbers generated based on physical processes rather than by software tools) are typically required in our everyday life: mobile communications, e-mail access, online payments, cashless payments, ATMs, e-banking, Internet trade, point of sale, prepaid cards, wireless keys, general cybersecurity, distributed power grid security, etc.

True random number generators (TRNG) typically work by providing a source of truly random numbers that do not come from a mathematical process, such as those used to generate pseudo random numbers in pseudo random number generators (PRNG). Source of true randomness can be from, for example, radioactive decay (typically slow), the chaotic motion of fluids (typically very slow), atmospheric noise (typically slow), quantum-based, or from other unpredictable systems that cannot be guessed by another even with access to a similar or the same device.

The generation of true random numbers at rates higher than 1 Gbit/s is an unmet market need, and according to certain recent publications, the market is in need of stable high throughput TRNGs with throughputs of up to 30 Gbit/sec. Indeed, currently available high-throughput TRNGs are costly and their number generation rates are limited to sub-Gbit/s rates. Many of these currently available TRNGs employ various sources of entropy (e.g., shot noise, thermal noise, and reverse biased Zener diodes), which are typically cheaper, less reliable, and provide lower throughput, while quantum optical TRNGS are able to provide very high more robust throughput.

SUMMARY

Exemplary embodiments of the present invention can provide a true random number generator. The exemplary true random number generator can include a light source configured to produce randomly distributed photons, a plurality of detection channels configured to receive the randomly distributed photons produced by the light source, where each detection channel can include a photon sensor configured to detect a receipt of at least one photon during successive integration time-periods and generate an output signal by assigning a value for each integration time-period based on whether at least one photon was received during each integration time-period, a signal conditioning unit configured to condition the output signal of each of the plurality of detection channels and generate a conditioned output signal for each of the plurality of detection channels, and a signal processing unit configured to combine the conditioned output signals and generate a true random number based on the combination of the conditioned output signals.

According to certain exemplary embodiments, the light source can include a Lambertian light source and/or the successive integration time-periods can be a function of a photon detection rate of the photon sensor.

According to certain exemplary embodiments, the signal conditioning unit can be configured to minimize cross-talk between the plurality of detection channels. The signal conditioning unit can also be configured to compare successive values in conditioning the output signal of each of the plurality of detection channels, and the comparison of successive values can include comparing whether successive values are equal. Further, conditioning the output signal can include discarding the values when the successive values are equal and adopting the first of the successive values when the successive values are different.

According to certain exemplary embodiments, the signal processing unit can be configured to combine the conditioned output signals sequentially in producing the true random number.

According to certain exemplary embodiments, the light source and the integration time-periods can be configured such that a probability of receiving at least one photon during each integration time-period is approximately one-half.

According to certain exemplary embodiments, the true random number generator can include more than 10 detection channels, more than 30 detection channels, or more than 100 detection channels. According to certain exemplary embodiments, the true random number generator can include 32 detection channels.

According to certain exemplary embodiments, the true random number generator can provide a throughput of at least 100 Mbit/s, a throughput of at least 1 Gbit/s, a throughput of at least 10 Gbit/s, or a throughput of at least 100 Gbit/s.

Another embodiment of the present invention can provide an exemplary method for generating true random numbers. The exemplary method can include providing a light source configured to produce randomly distributed photons, receiving the randomly distributed photons produced by the light source using a plurality of detection channels, detecting a receipt of at least one photon during successive integration time-periods using a photon sensor, generating an output signal by assigning a value for each integration time-period based on whether at least one photon was received during each integration time-period, conditioning the output signal of each of the plurality of detection channels and generating a conditioned output signal for each of the plurality of detection channels using the signal conditioning unit, and combining the conditioned output signals and generating a true random number based on the combination of the conditioned output signals using a signal processing unit.

Yet another embodiment of the present invention can provide a method for requiring a true random number. The method can include obtaining a random number generated by a true random number generator including a light source configured to produce randomly distributed photons, a plurality of detection channels configured to receive the randomly distributed photons produced by the light source, where each detection channel can include a photon sensor configured to detect a receipt of at least one photon during successive integration time-periods and generate an output signal by assigning a value for each integration time-period based on whether at least one photon was received during each integration time-period, a signal conditioning unit configured to condition the output signal of each of the plurality of detection channels and generate a conditioned output signal for each of the plurality of detection channels, and a signal processing unit configured to combine the conditioned output signals and generate a true random number based on the combination of the conditioned output signals.

DETAILED DESCRIPTION

Exemplary embodiments of the present invention can provide a novel quantum multi-channel true random number generator (TRNG) that can provide generation of true random numbers at the rates up to 30 Gbit/s. According to certain exemplary embodiments, true random numbers can be generated by single photon detection to exploit fundamental random photon fluxes emitted by a light source. An exemplary photon detector for spectroscopy is described in U.S. Pat. No. 8,581,098, which is incorporated by reference herein in its entirety. For example, the exemplary TRNG can include a Lambertian light source and a multi-channel single photon detector. Further, the multi-channel single photon detector can be capable of detecting individual photons at the rate as high as $10^8$ photon/s per channel. This high photon detection rate along with high performance data processing and transfer electronics can enable the exemplary TRNG to provide a random number generation rate of at least 1 Gbit/s.

For example, each detected single photon can be the source of the random numbers. If random bits based on photon arrival events are extracted, 2 bits of raw random sequence, or 0.5 bit/sec of conditioned random numbers, can be obtained for each detected photon. Alternatively, other parameters of the received photon flux can be utilized as the source of the random number (e.g., time intervals between consecutive photon arrivals). Utilizing other such parameters, the number of raw bits per photon can be as high as 8 bits for 10 ns average intervals if the accuracy of the time-to-digital conversion is in the range of 1 ps.

Figure 1:
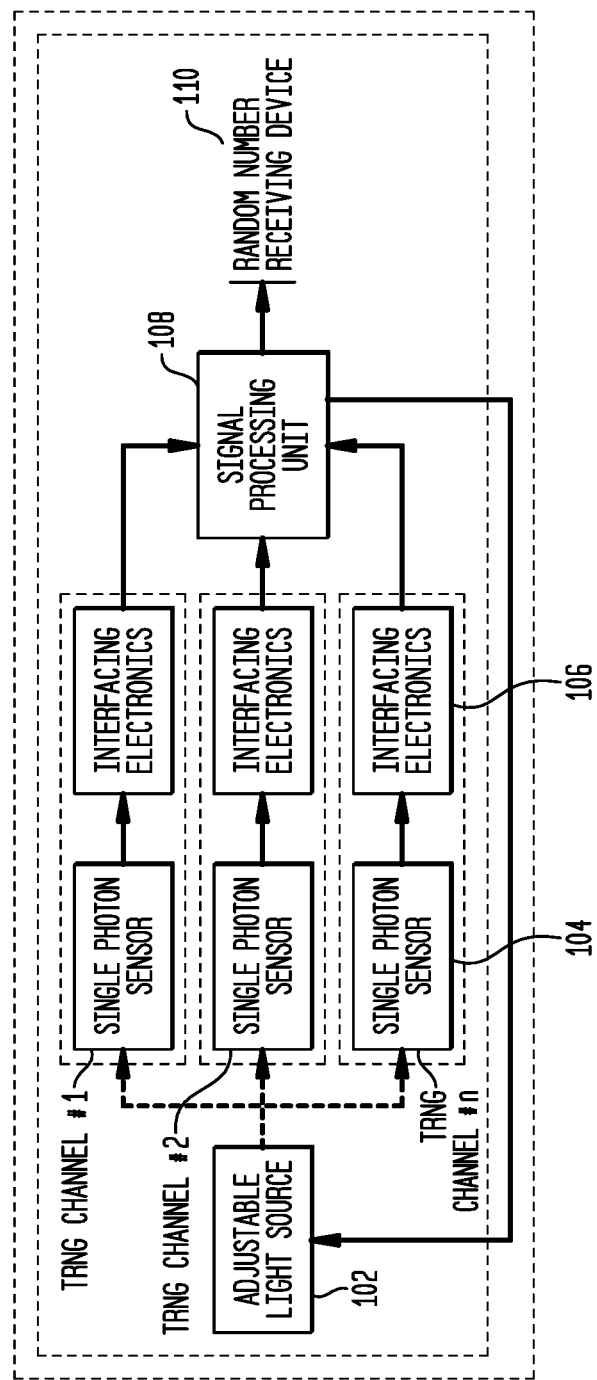
FIG. 1 shows an exemplary block diagram of an exemplary multi-channel true random number generator according to an embodiment of the present invention.

As described herein, embodiments of the present invention can provide a high throughput quantum TRNG based on the detection of single photons by a multi-channel single photon detector. A block diagram illustration of an exemplary TRNG 100 according to an embodiment of the present invention is provided in FIG. 1. As shown in FIG. 1, the exemplary system 100 can include an adjustable light source 102 and a plurality of channels feeding into a signal processing unit 108, which can output the generated random number to random number receiving device 110. Each channel can include, for example, a single photo sensor 104 and interfacing electronics 106. According to one embodiment of the present system, the single photon sensor can include a single photon photomultiplier tube (PMT). According to another embodiment of the present invention, the single photon sensor 104 can include, for example, a single photon detector including a matrix or an array of multiple semiconductor photo detectors (e.g., silicon-photomultipliers (SiPMs), multi-pixel photon counters (MP-PCs), single-photon avalanche diodes (SPAD), etc.). According to an exemplary embodiment, the exemplary TRNG can include 32 such high-speed channels. Alternatively, the multi-channel photon detector can include 8 channels, 16 channels, 64 channels, or any other desired number of channels. According to certain exemplary embodiments, the exemplary multi-channel TRNG can be implemented, for example, employing commercial multi-channel photomultipliers having more than one channel. For example, Hamamatsu 4-channel, 16-channel, 32-channel and 96-channel PMTs. Alternatively, SiPM or SPAD arrays containing from four to thousands of channels can also be employed. TRNG random number bitrates are directly proportional to the number of channels. Accordingly, depending on the number of channels used, the bitrate of the exemplary multichannel TRNG can range, for example, from 100 Mbit/s up to 100 Gbit/s and above.

In operation, the adjustable light source can simultaneously illuminate an array of multiple individual single photon sensors (e.g., an array of several hundred SiPMs, SPADs or multi-channel PMT). In response to the incident photons, the single photon sensors can produce output electric pulses, which are randomly distributed in time. Additional output random electric pulses can be produced by the single photon sensors due to their dark count. The output pulses of the photon sensors can be output to interfacing electronics (IE) (e.g., comparators, time-to digital converters, and others). The IE can process the input signals and output signals, which can include transformed digital signals (e.g., logical levels) to the signal-processing unit (HSPU) (e.g., a field programmable gate array (FPGA), microprocessor, etc.). The HSPU can count individual photons and/or measure the time intervals between arrivals of consecutive photons, which can output the random numbers to a computer or other random number receiving device (e.g., various electronic components and/or embedded systems, electro-optical modulators, polarizers, network cards, key management hard/form/software, etc.). Optionally, the HSPU can be designed to control and adjust comparators' thresholds individually to compensate for uneven response from individual single photon sensors in the array. According to certain exemplary embodiments, the IE and HSPU can be combined into a custom application specific integrated circuit (ASIC).

According to certain exemplary embodiments, the single photon detector can include a 32-channel single photon detector adapted to detect up to $10^8$ photon/s per channel (or up to $3.2 \times 10^9$ photon/s total). In the exemplary TRNGs, each detected single photon can be a source of a random number. With appropriate data processing, single photons can be detected, for example, at a total rate $10^8 \times 32 = 3.2 \times 10^9$ per second. Depending on the method of the random number extraction, 8 bits per photon can be obtained, which can result in a 30 Gbit/sec data stream. According to certain exemplary embodiments, the exemplary detector can include a 32-channel PMT, 32 high bandwidth 20 dB amplifiers (one per channel), 32 high speed low-voltage differential signal (LVDS) comparators (one per channel), a high speed FPGA photon counter, and a USB controller. The high throughput can be obtained for example, via the multiple channels and the high detection rate for each channel. The high detection rate for each channel can be obtained, for example, by utilizing photon detectors having a short "dead time" to enable high-speed photon detection. Further, high-speed detection can further be achieved by adjusting the internal gain of the photon detector to compensate for the "dead time" of the photon detector.

In response to single photons, the PMT can, for example, generate 1 ns pulses, which can be amplified to ~50 mV range by the pulse amplifiers and converted into LVDS logical levels by the comparators. The FPGA can count the LVDS-level pulses during the integration intervals $\Delta T$ (e.g., 1 μs, etc.). Then, the FPGA can build an output sequence according to any desired formatting and interfaces (e.g., USB transfer to a PC, etc.). The system can provide, for example, up to 32 MB/sec data transfer and recording rate.

According to exemplary embodiments, pulses produced by the PMTs can be a result of multiple multiplication stages at the dynodes with a coefficient at each dynode. The coefficients can vary depending on many factors, and produced pulses corresponding to different photons can have different magnitudes. The differing magnitudes, along with finite tolerance of comparator threshold, can necessitate pre-amplification of the pulses. However, if the amplification ratio is too high, pulses with large magnitudes can, for example, get into a saturation region of the amplifiers or be out of the comparator input range. In both cases, that can lead to broadening of the pulses thereby decreasing the maximum count rates.

Figure 2:
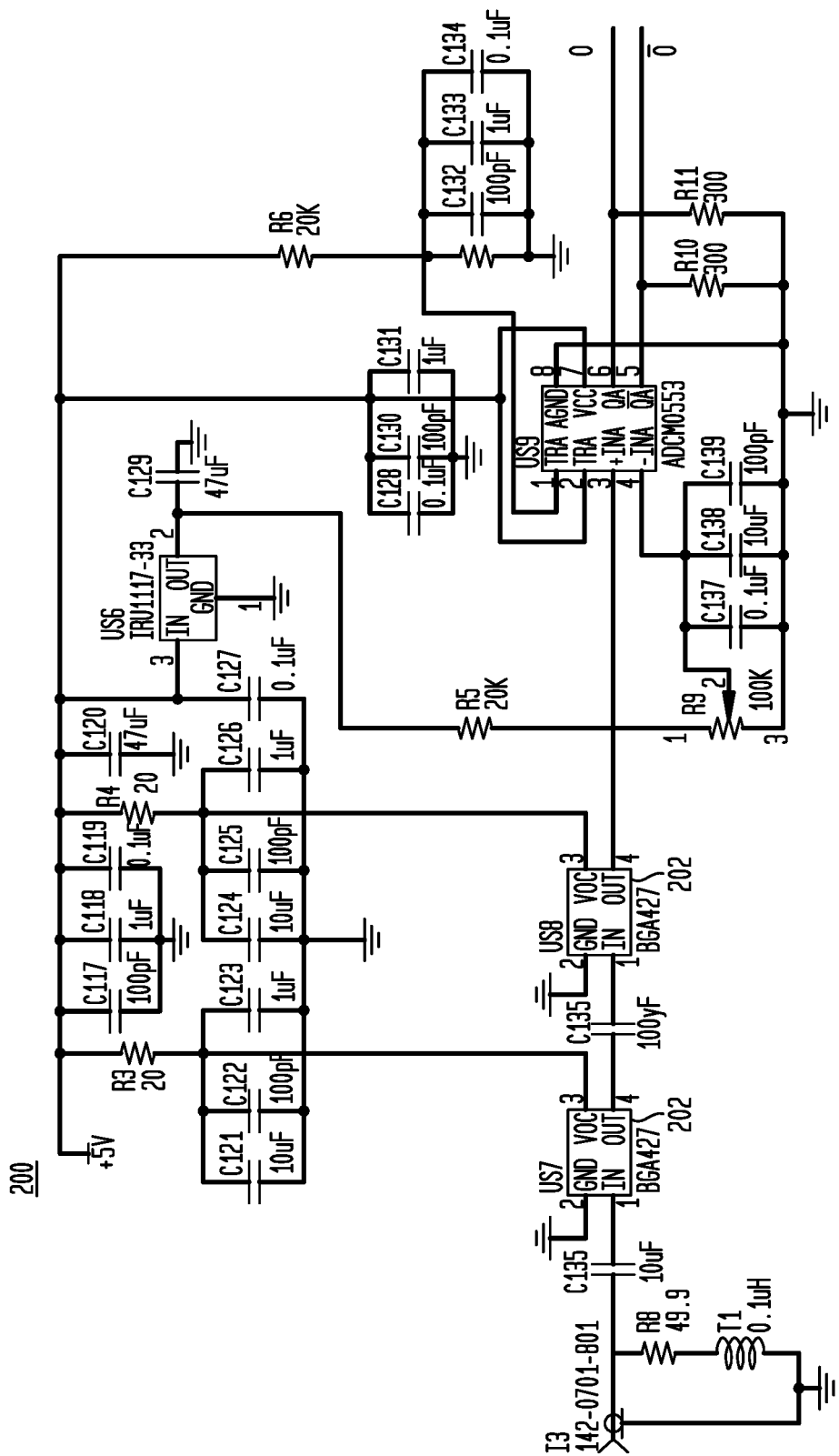
FIG. 2 is an exemplary schematic of an exemplary amplifier according to an embodiment of the present invention.

Accordingly, as shown in FIG. 2, embodiments of the present invention can provide optimized amplifier 200. For example, according to one embodiment the exemplary amplifier 200 can include a two stage amplifier having 2 cascaded amplifiers 202 (e.g., BGA 427 amplifiers (U57 and U58)), which can provide ~40 db of total amplification. According to certain exemplary embodiments, each amplifier can invert the polarity of the pulse, such that the amplified pulses are negative. The amplified signal can then go to the LVDS comparator (U59). The reference voltage can be adjusted using potentiometer R9 from 0 to 3.3 volts. When the negative amplified signal pulse goes to the comparator, it can generate a LVDS-level output pulse, which can go to the counters. The exemplary 2-stage amplifier scheme can be especially beneficial in the case where the PMT voltage is reduced to have better counts at high light intensity on all channels simultaneously. In this case the PMT pulses will become lower and higher amplification may be required. Nevertheless, the exemplary 2 stage amplifier scheme can be redundant and can lead to spreading of output pulses width due and reaching its saturation region too often.

Alternatively, embodiments of the present invention can provide a 1-stage amplifier. The exemplary 1-stage amplifier can be similar to the 2-stage amplifier shown in FIG. 2, but without amplifier U57 and capacitor C35. The resulting scheme can provide 20 dB amplification and changed polarity of the pulse only once. After the amplifier, the positive pulse goes to the comparator, whose reference voltage can be set from 1.2V (i.e., middle point of the amplifier) up to the amplified pulse height. Preferably, the threshold voltage is chosen as close to the pulse bottom as possible while being above the noise level. According to one embodiment, a threshold voltage of 1350 mV can be provided. The 1-stage amplifier provides less amplification, and can result in losing some very small pulses in the noise floor, however, the loss of pulses is negligible.

According to exemplary embodiments of the present invention, the intensity of the light source and the integration time $\Delta T$ can be adjusted so that the probability of the photon registration by the system can be established at a desired percentage. Establishing and adjusting the intensity of the light source and the integration time $\Delta T$ can also take into account the detection rate of the photon detectors. This probability refers to the probability of photons being registered for given integration intervals. For example, the intensity of the light source and the integration time $\Delta T$ can be adjusted so that the probability of the photon registration by the system can be 50%. This would mean that in 50% of the integration intervals, photons are not registered. This probability can be adjusted to a desired percentage (e.g., 10%, 25%, 75%, etc.).

Figure 3:
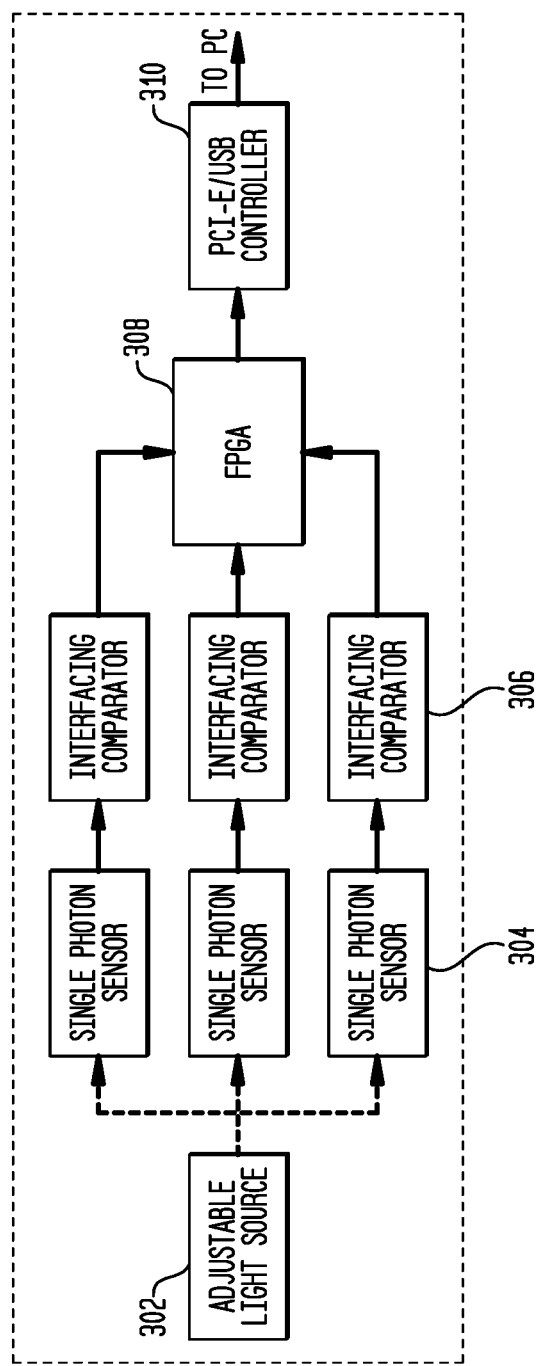
FIG. 3 shows an exemplary block diagram of an exemplary multi-channel true random number generator according to an embodiment of the present invention.

In operation, the FPGA can count the photons detected during $\Delta T$ and assign a corresponding the bit value. For example, a "0" can be assigned for zero photon count and a "1" can be assigned for photon counts equal to and higher than 1. As shown in FIG. 3, exemplary TRNG 300 can transfer the obtained sequence of "0" and "1" bits to a PC or a network arrangement with multiple PC clients using PCI-E or a USB controller 310. As shown in FIG. 3, exemplary TRNG 300 is substantially similar to exemplary TRNG 100 shown in FIG. 1. As shown in FIG. 3, the exemplary system 300 can include an adjustable light source 302 and a plurality of channels feeding into a signal processing unit (e.g., FPGA 308), which can output the generated random number to PCI-E or USB controller 310. Each channel can include, for example, a single photo sensor 304 and interfacing electronics 306.

Random numbers can be generated at 8 Mbit/s per channel (256 Mbit/sec total rate) at 4 million counts per second per channel. Further, a good quality of the generated random sequences can be achieved.

Figure 4:
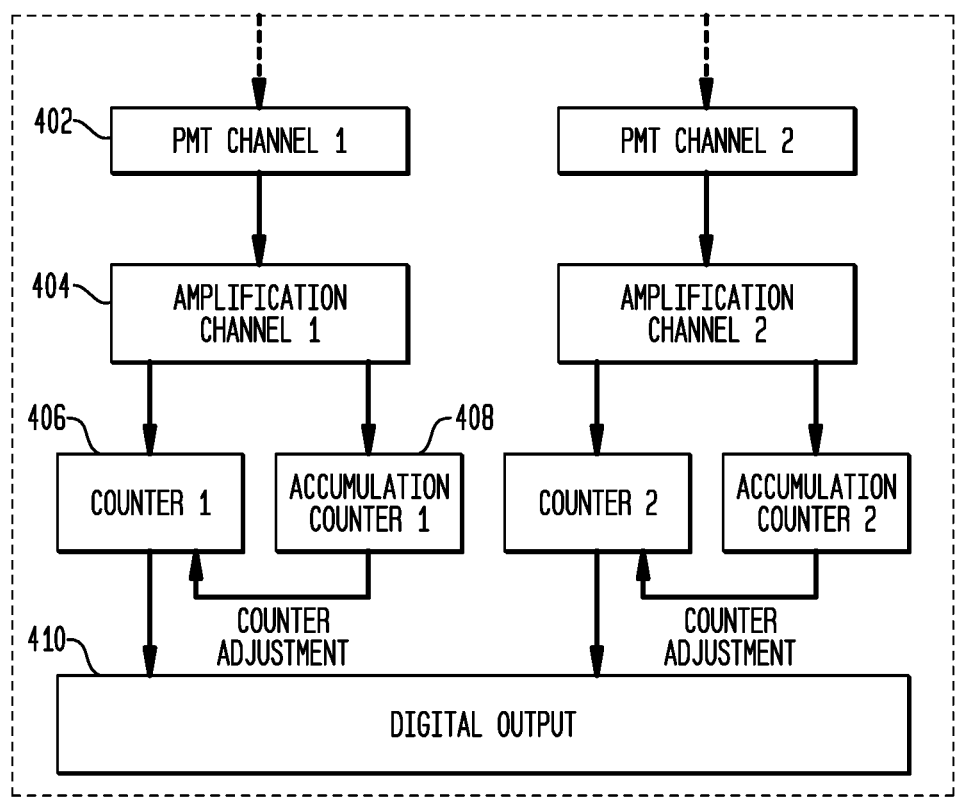
FIG. 4 shows an exemplary block diagram of an exemplary multi-channel true random number generator according to an embodiment of the present invention.

FIG. 4 shows a block diagram 400 of two exemplary channels of a TRNG according to an embodiment of the present invention. As shown in FIG. 4, PMT 402 of each channel can detect photon flux of the light source and can generate current pulses for the detected photons. The signal is amplified by amplifier 404, and the number of pulses are counted by counter 406 during a set integration period. As described herein, the integration interval for counter 406 can be adjusted by accumulation counter 408, and counter 406 can output the digital output 410 (e.g., '0' in instances where the counter counted zero pulses and '1' in instances where the counter counted one or more pulses). In order to obtain a truly random binary sequence, it is preferable that the probability of '0's and '1's in the sequence are the same. For any intensity of the photon flux in order to achieve 50% probability of finding zero photons (and, accordingly, the probability of finding one or more photons) the integration interval is preferably chosen in such a way, that the average number of photons in it will be 0.69314 . . . . Accordingly, for example, if the photon flux has 10 million photons per second, the integration interval is preferably ~69.314 ns.

However, the photon source typically is slightly unstable, and therefore the average number of photons in the flux might change over time. Accordingly, in order to keep having 50% probability of having zero photons in the integration interval, the interval can be adjusted in accordance with the changes of the photon flux. To perform an adjustment, an average number of counts over a given number of integration intervals (e.g., 10, 100, 10000, etc.) can be determined. If the average number becomes higher than necessary to produce 50% of zero photons in the chosen integration interval, the FPGA can increase the integration interval. If the average number becomes lower, the FPGA can decrease the integration interval. Since these variations of counts might be different in each channel, the adjustment of the integration interval can be performed separately for each channel.

Figure 5:
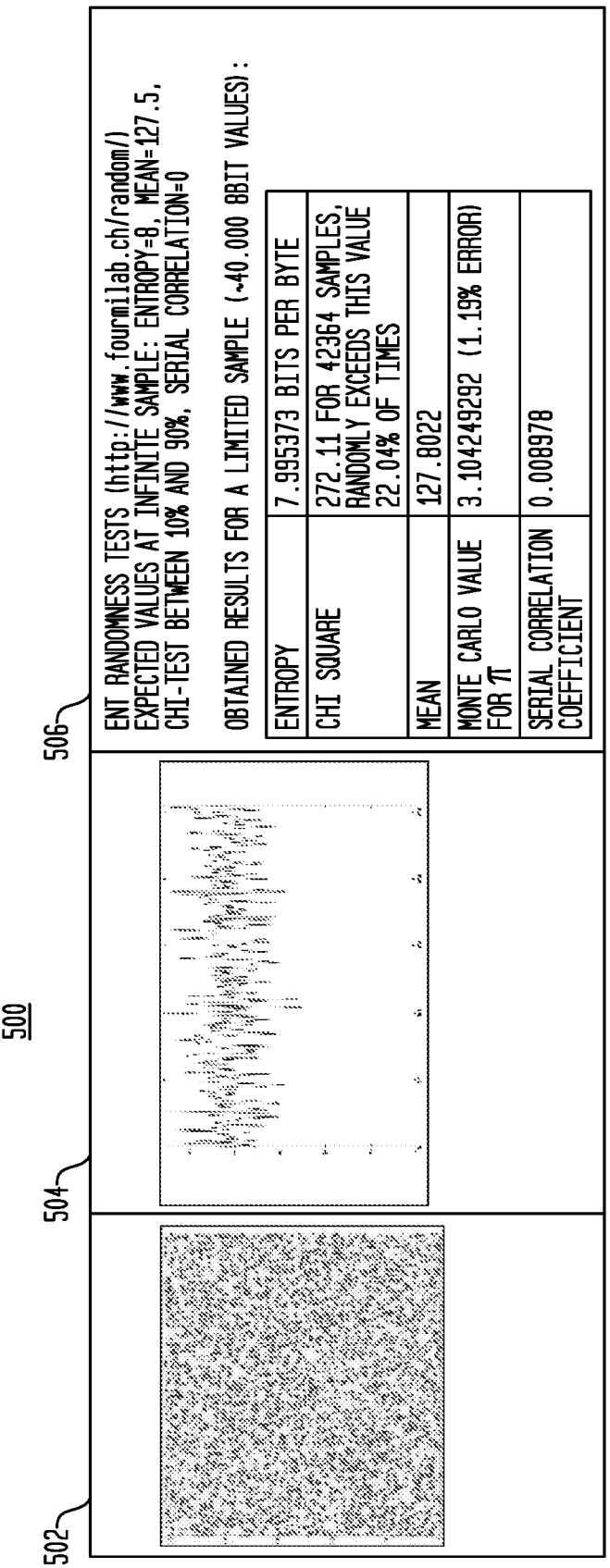
FIG. 5 shows exemplary results of a randomness test of an exemplary multi-channel true random number generator according to an embodiment of the present invention.

The individual TRNG channels of the exemplary TRNG typically produce raw streams of random numbers. FIG. 5 shows exemplary results 500 of a randomness test of an exemplary multi-channel true random number generator according to an embodiment of the present invention. Plot 502 is a visual representation of random sequences generated by a 32-channel single photon detector according to embodiments of the present invention. The photon collection time $\Delta T$ is chosen so that the probability of getting "0" counts is 50%. The distributions of the output random bits corrected with AMLS method shows that with an appropriate selection of the detection thresholds, photon collection time, and the post-processing of the obtained sequences of random numbers, correlated bits can be excluded, and the biased sequence can be corrected. Plot 504 is a histogram plot of the number of occurrences of 8 bit integer values plotted against values, and table 506 summarizes statistical information in connection with the exemplary randomness test (e.g., Entropy of 7.995373 bits per byte; Chi Square of 272.11 for 42364 samples randomly exceeds this value 22.04% of times; mean of 127.8022; Monte Carlo value for Pi of 3.104249292 (1.19% error); and serial correlation coefficient of 0.008978). Accordingly, the raw streams may be biased and the raw streams from individual channels may be correlated. For example, single photon sensors often have channel crosstalk (e.g., photons received by one sensor channel may trigger electric pulses in neighboring channels—inter-channel crosstalk may be as high as 5-6%). A channel A may cause simultaneous response (false detection) in channel B and vice versa. The probability of the crosstalk, $P_{CROSSTALK}$, is a parameter of our simulation, and it may vary from $P_{CROSSTALK}=0$ to $P_{CROSSTALK}=1$. Accordingly, in order to obtain a conditioned sensor output, the raw streams obtained from individual channels can be first unbiased individually, and then combined into the TRNG output. The conditioning of the raw streams obtained from the individual channels can remove channel crosstalk from the combined output of the TRNG.

Figure 6:
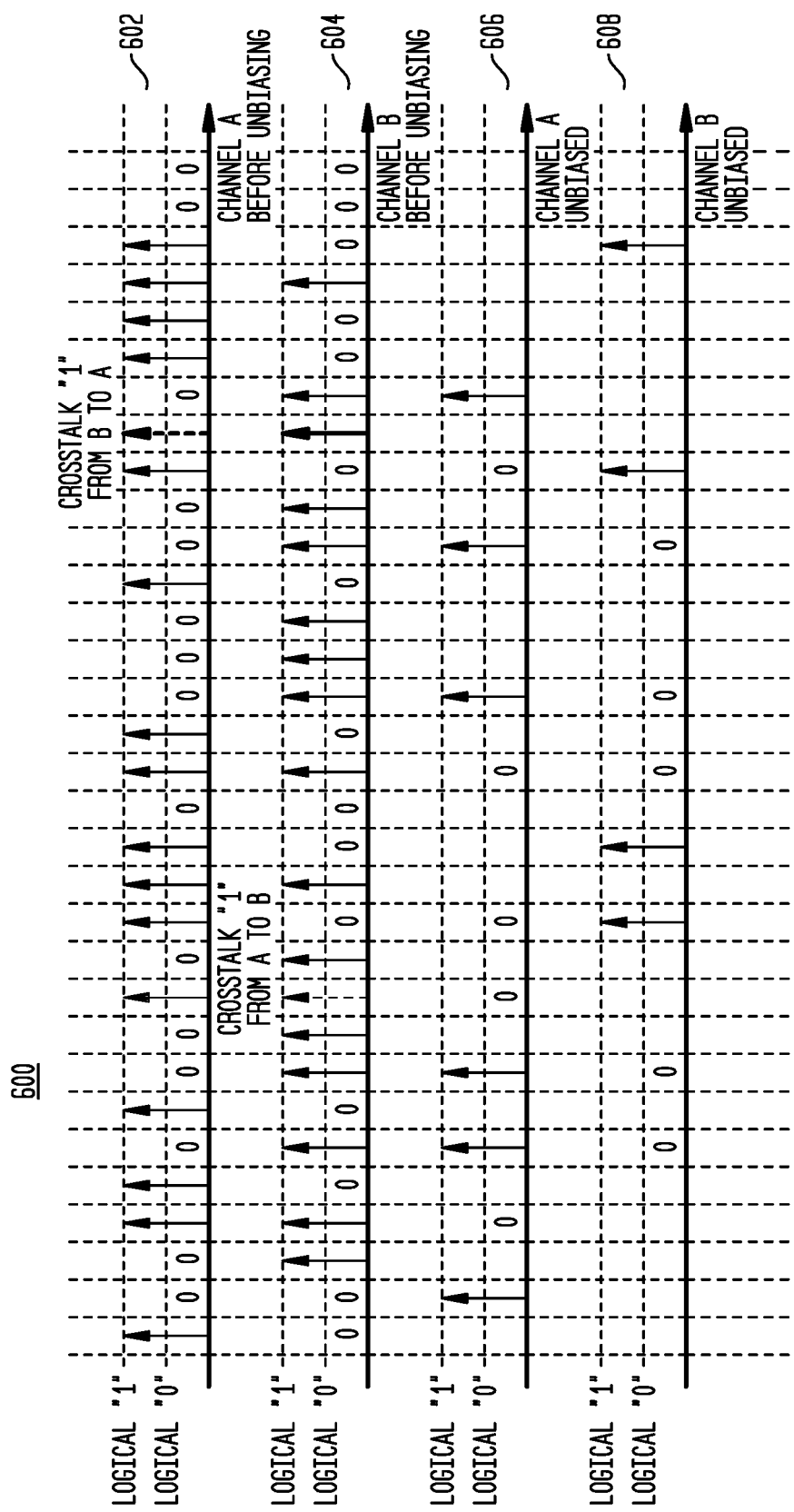
FIG. 6 shows graphs of exemplary random sequences generated by two channels and the conditioned output of two channels of an exemplary multi-channel true random number generator according to an embodiment of the present invention.

In order to obtain unbiased output random sequences, the data can be conditioned by applying an unbiasing algorithm. For example, according to certain exemplary embodiments, consecutive bits obtained in each individual channel can be grouped in pairs. For example, if the bit sequence in a pair was '1, 0'—the output bit can be set to have the value '1'; and if the bit sequence in a pair was '0, 1'—the output bit can be set to have the value '0'. Further, bit sequence pairs '1, 1' and '0, 0' can be discarded. This unbiasing algorithm can yield random sequences with 0.5 probabilities of 'ones' and 'zeros'. After the conditioning of the individual channels, the unbiased data from the channels can be combined into one output sequence. Exemplary unbiasing of exemplary Channels A and B are shown in FIG. 6. FIG. 6 shows graphs 600 of exemplary random sequences generated by two channels and the conditioned output of two channels of an exemplary multi-channel true random number generator according to an embodiment of the present invention according to an embodiment of the present invention. Specifically, plots 602 and 604 show random sequences generated by Channels A and B having channel cross talk, and plots 606 and 608 show the unbiased sequences obtained after conditioning.

The embodiments and examples shown above are illustrative, and many variations can be introduced to them without departing from the spirit of the disclosure. For example, elements and/or features of different illustrative and exemplary embodiments herein may be combined with each other and/or substituted with each other within the scope of the disclosure. For a better understanding of the disclosure, reference should be had to any accompanying drawings and descriptive matter in which there is illustrated exemplary embodiments of the present invention.

TABLE 1

Exemplary Simulated Crosstalk with 1 µs Detection Integration Window

|  | Exemplary Entropy (bits per byte) | Exemplary Optimum compression (% of the size reduction) | Exemplary Chi square distribution (value and percentage of times it exceeds this value) | Exemplary Arithmetic mean (127.5-random) | Exemplary Monte Carlo value for $\pi$ (value for $\pi$ and error percent) | Exemplary Serial correlation coefficient (totally uncorrelated-0.0) |
|---|---|---|---|---|---|---|
| Channel A, UNBIASED | 7.999376 | by 0% | 270.42, and randomly would exceed this value 24.23 percent of the times. | 127.6604 | 3.143559413 (error 0.06 percent). | −0.000972 |
| Channel B, Conditioned | 7.999332 | by 0% | 279.43, and randomly would exceed this value 14.04 percent of the times. | 127.4494 | 3.138242431 (error 0.11 percent). | 0.001868 |
| Channel A with crosstalk from channel B, Conditioned | 7.999444 | by 0% | 240.79, and randomly would exceed this value 72.96 percent of the times. | 127.6508 | 3.149310829 (error 0.25 percent). | −0.002766 |
| Channel B with crosstalk from channel A, Conditioned | 7.999365 | by 0% | 263.20, and randomly would exceed this value less than 34.87 percent of the times. | 127.4461 | 3.145796979 (error 0.13 percent). | 0.003366 |

TABLE 1-continued

Exemplary Simulated Crosstalk with 1 μs Detection Integration Window

| | Exemplary Entropy (bits per byte) | Exemplary Optimum compression (% of the size reduction) | Exemplary Chi square distribution (value and percentage of times it exceeds this value) | Exemplary Arithmetic mean (127.5-random) | Exemplary Monte Carlo value for π (value for π and error percent) | Exemplary Serial correlation coefficient (totally uncorrelated-0.0) |
|---|---|---|---|---|---|---|
| Channels A and B, Combined after conditioning | 7.999695 | by 0% | 254.40, and randomly would exceed this value less than 49.87 percent of the times. | 127.6106 | 3.140311095 (error 0.04 percent). | −0.001760 |
| Channel A and B Crosstalk 5%, Combined after conditioning | 7.999695 | by 0% | 252.39, and randomly would exceed this value less than 53.45 percent of the times. | 127.5488 | 3.145997553 (error 0.14 percent). | −0.000682 |
| Channel A and B Crosstalk 25%, Combined after conditioning | 7.999695 | by 0% | 242.64, and randomly would exceed this value less than 70.09 percent of the times. | 127.5402 | 3.138168099 (error 0.11 percent). | −0.000699 |
| Channel A and B Crosstalk 50%, Combined after conditioning | 7.999600 | by 0% | 294.02, and randomly would exceed this value less than 4.69 percent of the times. | 127.3877 | 3.146863301 (error 0.17 percent). | 0.000414 |
| Channel A and B Crosstalk 99%, Combined after conditioning | 7.999512 | by 0% | 274.02, and randomly would exceed this value less than 19.73 percent of the times. | 127.3272 | 3.137733757 (error 0.12 percent). | 0.000951 |
| Channel A and B Crosstalk 100%, Combined after conditioning | 3.999966 | by 0% | 6051877.50, and randomly would exceed this value less than 0.01 percent of the times. | 127.8406 | 2.712949330 (error 13.64 percent). | −0.000770 |
| Channel A and B combined before conditioning, 0% crosstalk | 7.810750 | by 2% | 182315.35, and randomly would exceed this value less than 0.01 percent of the times. | 150.5737 | 2.505238068 (error 20.26 percent). | 0.002374 |
| Channel A and B combined before conditioning, 5% crosstalk | 7.810694 | by 2% | 173644.52, and randomly would exceed this value less than 0.01 percent of the times. | 150.4988 | 2.506399037 (error 20.22 percent). | 0.001898 |

TABLE 2

Exemplary Experimental Results with 125 ns Detection Integration Window

| | Exemplary Entropy (bits per byte) | Exemplary Optimum compression (% of the size reduction) | Exemplary Chi square distribution (value and percentage of times it exceeds this value) | Exemplary Arithmetic mean (127.5-random) | Exemplary Monte Carlo value for π (value for π and error percent) | Exemplary Serial correlation coefficient (totally uncorrelated-0.0) |
|---|---|---|---|---|---|---|
| Channel 5 | 7.999923 | by 0% | 234.00, and randomly would exceed this value 82.30 percent of the times. | 127.4309 | 3.143115877 (error 0.05 percent). | 0.000337 |
| Channel 7 | 7.999946 | by 0% | 242.64, and randomly would exceed this value 70.09 percent of the times. | 127.4957 | 3.139915073 (error 0.05 percent). | −0.000201 |

TABLE 2-continued

Exemplary Experimental Results with 125 ns Detection Integration Window

| | Exemplary Entropy (bits per byte) | Exemplary Optimum compression (% of the size reduction) | Exemplary Chi square distribution (value and percentage of times it exceeds this value) | Exemplary Arithmetic mean (127.5-random) | Exemplary Monte Carlo value for $\pi$ (value for $\pi$ and error percent) | Exemplary Serial correlation coefficient (totally uncorrelated-0.0) |
|---|---|---|---|---|---|---|
| Channel 9 | 7.999919 | by 0% | 295.26, and randomly would exceed this value 4.22 percent of the times. | 127.4969 | 3.139586549 (error 0.06 percent). | −0.000153 |
| Channel 5 and 7 combined. | 7.999961 | by 0% | 290.13, and randomly would exceed this value less than 6.44 percent of the times. | 127.4688 | 3.141796309 (error 0.01 percent). | −0.000490 |
| Channels 5 and 9 combined. | 7.999954 | by 0% | 304.32, and randomly would exceed this value less than 1.85 percent of the times. | 127.4172 | 3.142264587 (error 0.02 percent). | −0.000483 |
| Channel 7 and 9 combined. | 7.999969 | by 0% | 252.40, and randomly would exceed this value less than 53.42 percent of the times. | 7.999969 | 3.142209850 (error 0.02 percent). | −0.000056 |

TABLE 3

Exemplary Experimental Results with 125 nsec Detection Integration Window with Three Neighboring Channels (e.g., channels 6, 7, and 8).

| | Exemplary Entropy (bits per byte) | Exemplary Optimum compression (% of the size reduction) | Exemplary Chi square distribution (value and percentage of times it exceeds this value) | Exemplary Arithmetic mean (127.5-random) | Exemplary Monte Carlo value for $\pi$ (value for $\pi$ and error percent) | Exemplary Serial correlation coefficient (if totally uncorrelated = 0.0) |
|---|---|---|---|---|---|---|
| Channel 6 | 7.999922 | by 0% | 251.33, and randomly would exceed this value 55.33 percent of the times. | 127.5738 | 3.137425890 (error 0.13 percent). | 0.000313 |
| Channel 7 | 7.999946 | by 0% | 242.64, and randomly would exceed this value 70.09 percent of the times. | 127.4957 | 3.139915073 (error 0.05 percent). | −0.000201 |
| Channel 8 | 7.999937 | by 0% | 282.00, and randomly would exceed this value 11.80 percent of the times. | 127.5098 | 3.143120281 (error 0.05 percent). | −0.000533 |
| Channels 6 and 7 combined. | 7.999966 | by 0% | 261.28, and randomly would exceed this value less than 38.00 percent of the times. | 127.5091 | 3.138306258 (error 0.10 percent). | 0.000270 |
| Channels 7 and 8 combined. | 7.999969 | by 0% | 274.10, and randomly would exceed this value less than 19.63 percent of the times. | 127.5106 | 3.139564689 (error 0.06 percent). | 0.000222 |
| Channels 6, 7 and 8 combined. | 7.999979 | by 0% | 252.92, and randomly would exceed this value less than 47.20 percent of the times. | 127.5016 | 3.140885280 (error 0.02 percent). | −0.000356 |

What is claimed is:

1. A true random number generator comprising:
a light source configured to produce randomly distributed photons;
a plurality of detection channels configured to receive the randomly distributed photons produced by the light source, each detection channel including a photon, sensor configured to detect a receipt of at least one photon during successive integration time-periods set for a corresponding detection channel amongst the plurality of detection channels, and generate an output signal for each integration time-period amongst the successive integration time-periods set for the corresponding detection channel, the output signal being assigned a first value in a case that at least one photon was not received during the integration time-period and being assigned a second value in a case that at least one photon was received during the integration time-period;
a signal processing unit configured to (i) condition the output signal of each of the plurality of detection channels and generate a conditioned output signal for each of the plurality of detection channels and (ii) combine the conditioned output signals and generate a true random number based on the combination of the conditioned output signals.

2. The true random number generator of claim 1, wherein the light source includes a Lambertian light source.

3. The true random number generator of claim 1, wherein the successive integration time-periods are a function of a photon detection rate of the photon sensor.

4. The true random number generator of claim 1, wherein the signal processing unit is configured to minimize crosstalk between the plurality of detection channels.

5. The true random number generator of claim 1, wherein the signal processing unit is configured to compare successive values in conditioning the output signal of each of the plurality of detection channels.

6. The true random number generator of claim 5, wherein the comparison of successive values includes comparing whether successive values are equal.

7. The true random number generator of claim 6, wherein conditioning the output signal includes discarding the values when the successive values are equal and adopting the first of the successive values when the successive values are different.

8. The true random number generator of claim 1, wherein the signal processing unit is configured to combine the conditioned output signals sequentially in producing the true random number.

9. The true random number generator of claim 1, wherein the light source and the integration time-periods are configured such that a probability of receiving at least one photon during each integration time-period is approximately one-half.

10. The true random number generator of claim 1, wherein the true random number generator includes 32 detection channels.

11. The true random number generator of claim 1, wherein the true random number generator includes more than 10 detection channels.

12. The true random number generator of claim 1, wherein the true random number generator includes more than 30 detection channels.

13. The true random number generator of claim 1, wherein the true random number generator includes more than 100 detection channels.

14. The true random number generator of claim 1, wherein the true random number generator provides a throughput of at least 100 Mbit/s.

15. The true random number generator of claim 1, wherein the true random number generator provides a throughput of at least 1 Gbit/s.

16. The true random number generator of claim 1, wherein the true random number generator provides a throughput of at least 10 Gbit/s.

17. The true random number generator of claim 1, wherein the true random number generator provides a throughput of at least 100 Gbit/s.

18. A method for requiring a true random number, comprising obtaining a random number generated by the true random number generator of claim 1.

19. The true random number generator of claim 1, wherein
adjustment of an integration time-period for a first detection channel, amongst the plurality of detection channels, is adjusted separately from an integration time-period for a second detection channel, amongst the plurality of detection channels, based on photon detection rates of photon sensors of said first and second detection channels, respectively, over a predetermined number of integration time-periods.

20. A method for generating true random numbers, the method comprising:
providing a light source configured to produce randomly distributed photons;
receiving the randomly distributed photons produced by the light source using a plurality of detection channels which include a plurality of photon sensors, respectively;
detecting, using a photon sensor amongst the plurality of photon sensors, a receipt of at least one photon during successive integration time-periods set for a corresponding detection channel amongst the plurality of detection channels;
generating an output signal for each integration time-period amongst the successive integration time-periods set for the corresponding detection channel, the output signal being assigned a first value in a case that at least one photon was not received during the integration time-period and being assigned a second value in a case that at least one photon was received during the integration time-period;
conditioning the output signal of each of the plurality of detection channels and generating a conditioned output signal for each of the plurality of detection channels;
and combining the conditioned output signals and generating a true random number based on the combination of the conditioned output signals using a signal processing unit.

* * * * *